April 21, 1925.
E. TIMMONS
PUMP PISTON
Filed Nov. 9, 1922
1,534,747
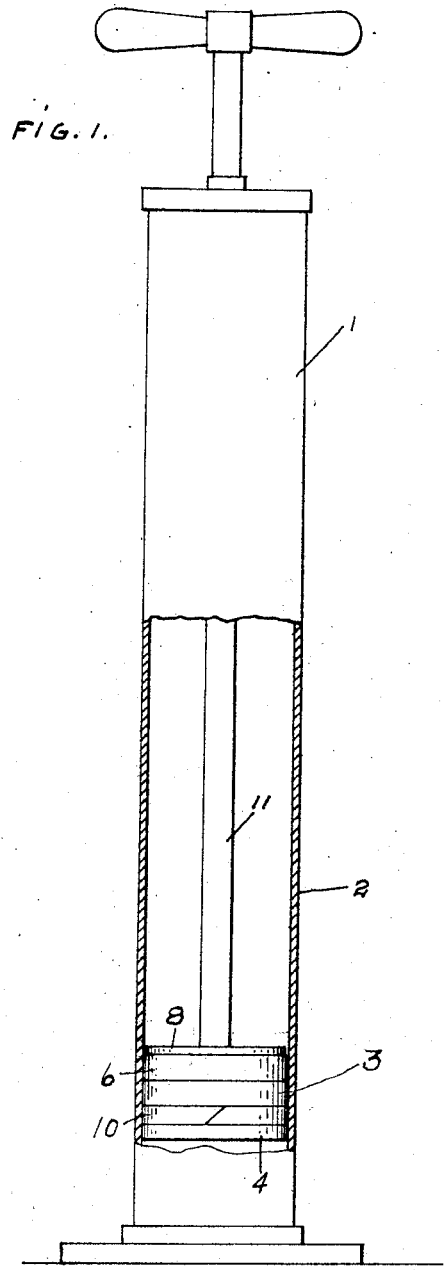
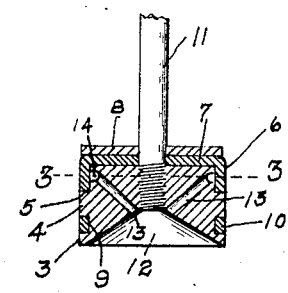
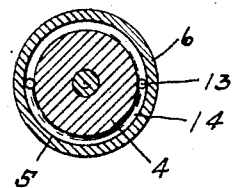
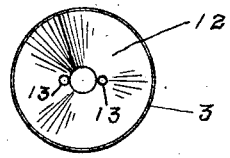
INVENTOR
ERNEST TIMMONS
BY
ATTORNEY Patented Apr. 21, 1925.

1,534,747

UNITED STATES PATENT OFFICE.

ERNEST TIMMONS, OF CICERO, INDIANA, ASSIGNOR OF ONE-HALF TO E. E. CORNTHWAITE, OF CICERO, INDIANA.

PUMP PISTON.

Application filed November 9, 1922. Serial No. 599,880.

*To all whom it may concern:*

Be it known that I, ERNEST TIMMONS, a citizen of the United States, residing at Cicero, in the county of Hamilton and State of Indiana, have invented certain new and useful Improvements in Pump Pistons, of which the following is a specification.

This invention relates to piston construction and is designed primarily for use in connection with pumps, although it will be fully understood that it may be successfully used in connection with various mechanisms employing pistons of this construction. The prime feature of the invention is the provision of means for employing air or liquid under pressure created by the movement of the piston for expanding the piston packing for obtaining a perfect seal or close adhesion between the piston and the walls of the cylinder in which it is operating.

A further feature of the invention is in so constructing the piston that on one stroke thereof air or the like will be gathered by the under face of the piston and directed through ports and delivered beneath the flange of the piston packing and preferably adjacent the edge thereof integral with the anchoring portion of the packing and gradually force its way out to the free edge of the packing thereby expanding the packing to its fullest extent and forcing the same against the wall of the cylinder with sufficient force to prevent any leakage past the piston.

Other objects and advantages will be hereinafter more fully set forth and pointed out in the accompanying specification.

In the accompanying drawings,

Figure 1 is a side elevation of the piston construction showing the same applied to use in connection with a pump structure, Figure 2 is a central transverse sectional view through the piston structure, Figure 3 is a sectional view as seen on line 3—3, Figure 2, and Figure 4 is a bottom plan view of the piston construction.

Referring to the drawings, 1 indicates a pump structure, such as is used for inflating tires or for various other purposes, comprising a cylinder 2, in which is mounted my improved form of piston 3, said piston comprising a metallic body portion 4 having a circumferential recess 5 at one end thereof into which fits the flange portion 6 of a piston leather or packing 7, said packing fitting over one end of the body portion and being held in engagement with the body portion by means of a washer 8, or in any other suitable manner. The peripheral face of the body portion 1 is also provided with a channel 9 in which is introduced a sealing ring 10, preferably of leather. The body portion 4, piston 7 and washer 8 are held together by means of a piston rod 11 which extends through the washer 8 and packing 7 and is threaded into the body portion 4, the rod 11 also being employed for reciprocating the piston within the cylinder 2.

In piston structures of this nature it is difficult to maintain a perfect seal between the wall of the cylinder and the piston after the packing 7 becomes somewhat worn, and to overcome this objectionable feature the face of the body portion 4, opposite the packing 7, is provided with a concavity 12 which, when the piston is being moved to force the contents of the pump into a tire or other object, will gather and compress air into the concavity and this compressed air is employed for expanding the flange of the packing 7 by providing ports 13 through the wall of the body portion, the inner ends of the ports communicating with the concavity, while the outer ends thereof communicate with a groove 14 arranged around the periphery of the body portion 1 and in close proximity to that edge of the flange 6 integral with the anchored portion of the packing. The force of the air or the like against the flange at this point will cause the flange to expand and firmly grip the wall of the cylinder 2 and to such an extent as to practically prevent any leakage between the packing and the wall of the cylinder.

It will further be seen that by placing the groove 14, as shown, the flange 6 will receive the full force of the air being forced through the ports 13 and that the flange will be expanded substantially its full depth rather than merely at its free edge.

It will likewise be seen that in view of the simplicity of the construction it may be very cheaply manufactured and assembled and although the piston is here shown and described as connected with a pump structure, the piston may be used for various other purposes and the manner of expanding the flange of the packing may be employed further for expanding the usual form of piston rings, if desired.

Having thus fully described my said invention, what I claim as new and desire to secure by Letters Patent, is:

A piston in the form of a cylindrical block having an axial threaded opening, a conical recess at its under side, an annular peripheral recess extending to its upper end with a deeper annular groove adjacent the upper end of the recess, an annular peripheral recess adjacent to the lower end of the block, and passages connecting the conical recess with said groove, in combination with a threaded rod engaging said axial opening, a cup-shaped packing on the upper end of the block with an aperture for said rod, said cup having a flange extending to the bottom of said first-named peripheral recess, means for holding said cup-shaped packing in place, and a packing ring in said second recess, substantially as set forth.

In witness whereof, I have hereunto set my hand and seal at Indianapolis, Indiana, this 4th day of November, A. D. nineteen hundred and twenty-two.

ERNEST TIMMONS. [L. S.]

Witnesses:
M. L. SHULER,
CAREY S. FRYE.